United States Patent [19]
Wiley, III

[11] Patent Number: 5,358,768
[45] Date of Patent: Oct. 25, 1994

[54] MAT FOR THE FLOOR OF A VEHICLE

[76] Inventor: James M. Wiley, III, 6416 Baird La., Bartlett, Tenn. 38135

[21] Appl. No.: 81,235

[22] Filed: Jun. 25, 1993

[51] Int. Cl.⁵ .............................................. B32B 3/06
[52] U.S. Cl. ....................................... 428/95; 428/99; 428/100; 15/215; 296/97.23
[58] Field of Search .......................... 428/95, 99, 100; 15/215; 296/97.23

[56] References Cited

U.S. PATENT DOCUMENTS

| | | | |
|---|---|---|---|
| 4,340,633 | 7/1982 | Robbins, Jr. | 428/99 |
| 4,481,240 | 11/1984 | Roth | 428/95 |
| 4,673,603 | 6/1987 | Roth | 428/95 X |
| 4,784,063 | 5/1988 | Reuben | 428/95 X |
| 4,917,932 | 4/1990 | McClung | 428/95 X |
| 4,921,742 | 5/1990 | Altus | 428/95 X |
| 5,003,664 | 4/1991 | Wong | 16/6 |
| 5,114,774 | 5/1992 | Maxim, Jr. | 428/88 X |
| 5,254,384 | 10/1993 | Gordon | 428/95 X |

Primary Examiner—Daniel R. Zirker
Attorney, Agent, or Firm—Walker, McKenzie & Walker

[57] ABSTRACT

A two-piece mat for the floor of a vehicle. The mat includes a lower mat structure for placement on the floor of a vehicle; an upper mat structure for placement over the upper surface of the lower mat structure; and attachment structure for removably attaching the upper mat structure to the lower mat structure. The attaching structure includes first attachment structure secured to the upper surface of the lower mat structure and includes second attachment structure secured to the lower surface of the upper mat structure for coacting with the first attachment structure to removably attach the upper mat structure to the lower mat structure.

5 Claims, 1 Drawing Sheet

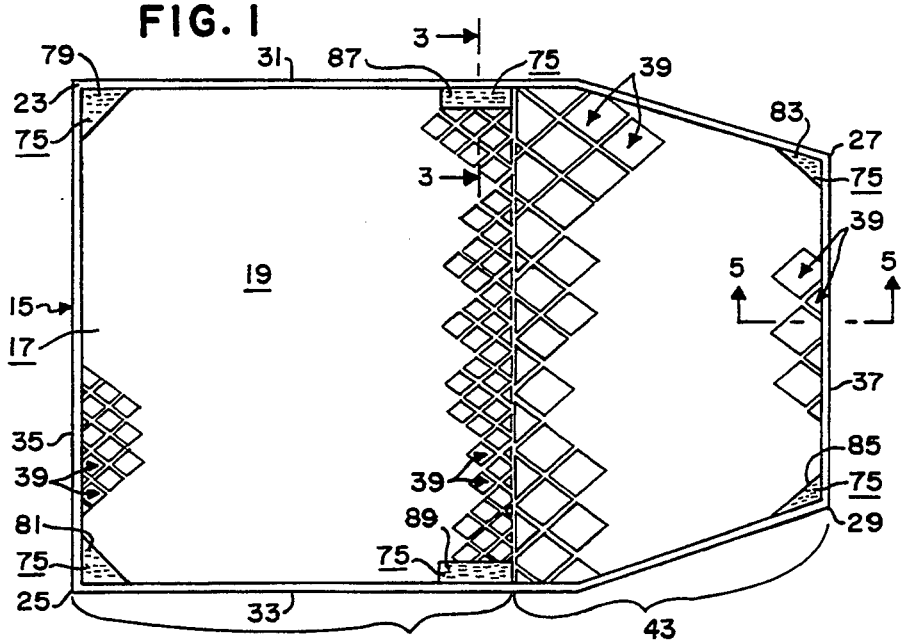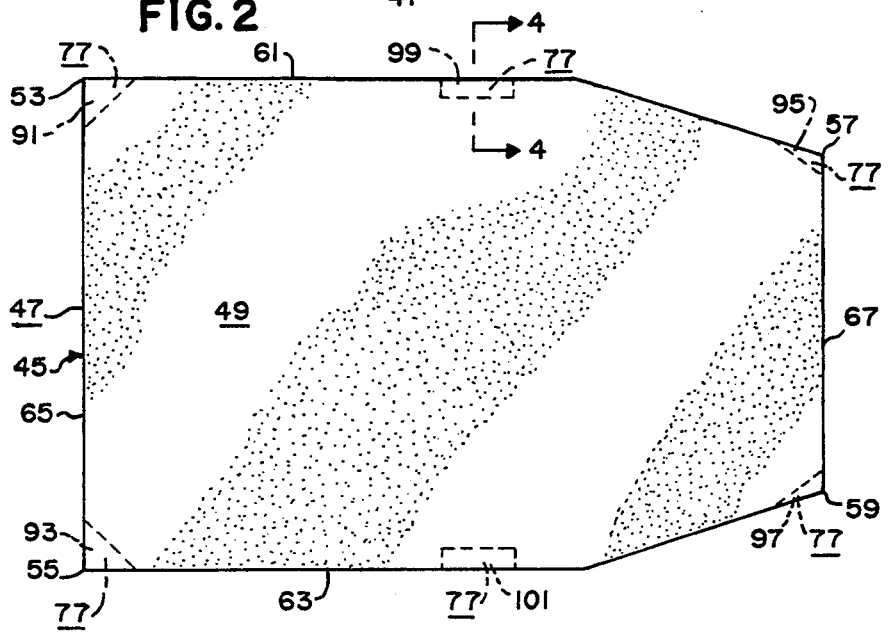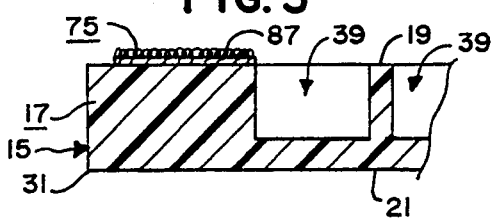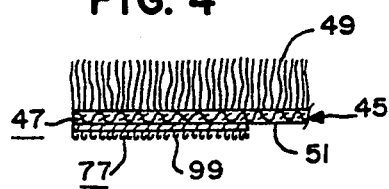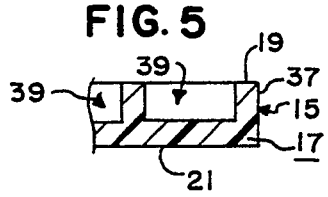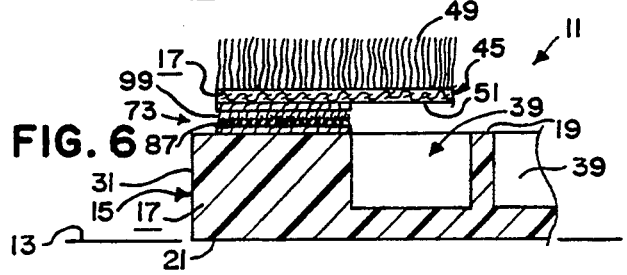

MAT FOR THE FLOOR OF A VEHICLE

BACKGROUND OF THE INVENTION

1. Field of the Invention

The present invention relates, in general, to mats for covering all or portions of the floor of vehicles.

2. Description of the Related Art

A carpet for covering the floor, or floorboard, is standard equipment for most present day automobiles. However, to protect the carpet from dirt, water, general wear and tear, and the like, many people place mats made of rubber composition, carpet, natural cocoa or sisal fiber, etc., over the carpet at least in the areas the driver and/or passengers are likely to place their feet. In addition, rubber floor mats have been developed with deep cavities and the like for holding a quantity of water or the like that might drain from a person's shoes or that might melt from snow or the like carried by a person's shoes, etc.

Nothing in the above identified prior art discloses or suggests the present invention. More specifically, nothing in the above identified prior art discloses or suggests a mat for the floor of a vehicle including, in general, a lower mat means for placement on the floor of a vehicle; the lower mat means including an upper surface an upper mat means for placement over the upper surface of the lower mat means; the upper mat means having a lower surface; and attachment means for removably attaching the upper mat means to the lower mat means; the attachment means including first attachment means secured to the upper surface of the lower mat means and including second attachment means secured to the lower surface of the upper mat means for coacting with the first attachment means to removably attach the upper mat means to the lower mat means.

SUMMARY OF THE INVENTION

The present invention is directed toward providing an improved mat for the floor of a vehicle. A basic concept of the present invention is to provide such a mat that includes, in general, a lower mat means for placement on the floor of a vehicle; the lower mat means including an upper surface; an upper mat means for placement over the upper surface of the lower mat means; the upper mat means having a lower surface; and attachment means for removably attaching the upper mat means to the lower mat means; the attachment means including first attachment means secured to the upper surface of the lower mat means and including second attachment means secured to the lower surface of the upper mat means for coacting with the first attachment means to removably attach the upper mat means to the lower mat means.

One object of the present invention is to provide a mat for covering the floor of a vehicle that normally provides a carpeted surface but that can be easily modified to remove the carpeted surface during adverse weather, etc.

Another object of the present invention is to provide a mat for covering the floor of a vehicle that provides a carpeted surface while also providing a reservoir for holding a quantity of water or the like that might drain from a person's shoes or that might melt from snow or the like carried by a person's shoes, etc.

Another object of the present invention is to provide a mat for covering the floor of a vehicle including an easily removable carpeted surface that can be easily washed or otherwise cleaned separate from the vehicle or the rest of the mat.

BRIEF DESCRIPTION OF THE DRAWINGS

FIG. 1 is a top plan view of the lower mat means of the mat of the present invention.

FIG. 2 is a top plan view of the upper mat means of the mat of the present invention.

FIG. 3 is a somewhat enlarged sectional view substantially as taken on line 3—3 of FIG. 1.

FIG. 4 is a somewhat enlarged sectional view substantially as taken on line 4—4 of FIG. 2.

FIG. 5 is a somewhat enlarged sectional view substantially as taken on line 5—5 of FIG. 1.

FIG. 6 is a sectional view showing the portions of the upper and lower mat means of FIGS. 3 and 4 attached together and placed on the floor of a vehicle.

DESCRIPTION OF THE PREFERRED EMBODIMENT

The preferred embodiment of the mat of the present invention is shown in FIGS. 1-6 and identified by the numeral 11. The mat 11 is especially designed for placement on the floor 13 of a vehicle such as an automobile or the like, either directly on top of the floor or on top of carpet or other material that covers the floor, etc.

The mat 11 includes a lower mat means 15 for placement on the floor 13 of a vehicle. The lower mat means 15 preferably includes a body 17 having an upper surface 19, a lower surface 21, a first corner 23, a second corner 25, a third corner 27, a fourth corner 29, a first side 31 extending between the first corner 23 and the third corner 27, a second side 33 extending between the second corner 25 and the fourth corner 29, a third side 35 extending between the first corner 23 and the second corner 25, and a fourth side 37 extending between the third corner 27 and the fourth corner 29. The upper surface 19 of the body 17 of the lower mat means 15 preferably has a plurality of cavities 39 therein for holding liquid such as water and the like. The specific size and shape of the cavities 39 may vary. For example, the upper surface 19 of the body 17 of the lower mat means 15 may be divided generally into a first section 41 extending between the first and second sides 31, 33 from the third side 35 to a point substantially half way or so to the fourth side 37, and a second section 43 extending between the first and second sides 31, 33 from the fourth side 37 to the edge of the first section 41 (see, in general, FIG. 1). The cavities 39 in the first section 41 may be generally square or diamond shaped in plan with dimensions of approximately 1 inch (25.4 millimeters) by 1 inch (25.4 millimeters) with a depth of approximately ½ inch (12.7 millimeters). The cavities 39 in the second section 43 may be generally square or diamond shaped in plan with dimensions of approximately 2 inches (50.8 millimeters) by 2 inches (50.8 millimeters) with a depth of approximately ¼ inch (6.35 millimeters). The body 17 of the lower mat means 15 may be constructed in various specific manners out of various specific materials as will now be apparent to those skilled in the art. Thus, for example, the body 17 of the lower mat means 15 is preferably molded, cast, or otherwise constructed out of a rubber or plastic composition or the like. The specific size and shape of the body 17 of the lower mat means 15 may vary. For example, the body 17 of the lower mat means 15 may be a substantially flat, generally rectangular member with one end thereof somewhat tapered as clearly shown in FIG. 1. Such a design can be used for the front floorboard of automobiles and the like with the tapered portion fitting into the typical wheel well portion of the floorboard, etc., as will now be apparent to those skilled in the art. However, it should be understood that the size and shape of the body 17 of the lower mat means 15 for use with different automobiles or the like or for use in the rear floor of automobiles or the like can be substantially different from that shown in FIG. 1 without departing from the spirit and scope of the present invention.

The mat 11 includes an upper mat means 45 for placement over the upper surface 19 of the lower mat means 15. The upper mat means 45 preferably includes a body 47 having an upper surface 49, a lower surface 51, a first corner 53, a second corner 55, a third corner 57, a fourth corner 59, a first side 61 extending between the first corner 53 and the third corner 57, a second side 63 extending between the second corner 55 and the fourth corner 59, a third side 65 extending between the first corner 53 and the second corner 55, and a fourth side 67 extending between the third corner 57 and the fourth corner 59. The body 47 of the upper mat means 45 may be constructed in various specific manners out of various specific materials as will now be apparent to those skilled in the art. Thus, for example, the upper surface 49 of the body 47 of the upper mat means 45 preferably includes a carpet mat formed of Olefin ® carpet or the like. The lower surface 51 of the body 47 of the of the upper mat means 45 preferably includes a backing material formed of a rubber and/or plastic composition or the like sewn or otherwise attached in some way to the carpet mat. The specific size and shape of the body 47 of the upper mat means 45 may vary. For example, the body 47 of the upper mat means 45 may be a substantially flat, generally rectangular member with one end thereof somewhat tapered as clearly shown in FIG. 2. Thus, the shape of the body 47 of the upper mat means 45 is preferably substantially identical to the shape of the body 17 of the lower mat means 15. However, the body 47 of the upper mat means 45 is preferably slightly smaller in plan than the body 17 of the lower mat means 15. That is, the body 17 of the lower mat means 15 is preferably about 0.5 inch (12.7 millimeters) wider and 0.5 inch (12.7 millimeters) longer than the body 47 of the upper mat means 45. As mentioned above, such a design can be used for the front floorboard of automobiles and the like with the tapered portion fitting into the typical wheel well portion of the floorboard, etc., as will now be apparent to those skilled in the art. However, it should be understood that the size and shape of the body 47 of the upper mat means 45 for use with different automobiles or the like or for use in the rear floor of automobiles or the like can be substantially different from that shown in FIG. 2 without departing from the spirit and scope of the present invention.

The mat 11 includes attachment means 73 for removably attaching the upper mat means 45 to the lower mat means 15. The attachment means 73 includes first attachment means 75 secured to the upper surface 19 of the body 17 of the lower mat means 15 and includes second attachment means 77 secured to the lower surface 51 of the body 47 of the upper mat means 45 for coacting with the first attachment means 75 to removably attach the upper mat means 45 to the lower mat means 15. The attachment means 73 preferably consist of hook and loop type fasteners, such as, for example, Velcro ® brand hook and loop type fasteners. More specifically, the first attachment means 75 may consist of one or more pieces of loop type Velcro ® brand fasteners and the second attachment means 77 may consist of one or more pieces of hook type Velcro ® brand fasteners to thereby allow the upper mat means 45 to be secured to the lower mat means 15 by being merely pressed thereto and to thereby allow the upper mat means 45 to be subsequently removed from the lower mat means 15 by being merely pulled away therefrom as will now be apparent to those skilled in the art.

The first attachment means 75 of the attachment means 73 preferably includes a first member 79 positioned at the first corner 23 of the upper surface 19 of the body 17 of the lower mat means 15, a second member 81 positioned at the second corner 25 of the upper surface 19 of the body 17 of the lower mat means 15, a third member 83 positioned at the third corner 27 of the upper surface 19 of the body 17 of the lower mat means 15, a fourth member 85 positioned at the fourth corner 29 of the upper surface 19 of the body 17 of the lower mat means 15, a fifth member 87 positioned adjacent the first side 31 of the upper surface 19 of the body 17 of the lower mat means 15 substantially midway between the first corner 23 and the third corner 27 thereof, and a sixth member 89 positioned adjacent the second side 33 of the upper surface 19 of the body 17 of the lower mat means 15 substantially midway between the second corner 25 and the fourth corner 29 thereof.

The second attachment means 77 of the attachment means 73 preferably includes a first member 91 positioned at the first corner 53 of the lower surface 51 of the body 47 of the upper mat means 45, a second member 93 positioned at the second corner 55 of the lower surface 51 of the body 47 of the upper mat means 45, a third member 95 positioned at the third corner 57 of the lower surface 51 of the body 47 of the upper mat means 45, a fourth member 97 positioned at the fourth corner 59 of the lower surface 51 of the body 47 of the upper mat means 45, a fifth member 99 positioned adjacent the first side 61 of the lower surface 51 of the body 47 of the lower mat means 45 substantially midway between the first corner 53 and the third corner 57 thereof, and a sixth member 101 positioned adjacent the second side 63 of the lower surface 51 of the body 47 of the lower mat means 45 substantially midway between the second corner 55 and the fourth corner 59 thereof.

The use and operation of the mat 11 of the present invention is quite simple. To install the mat 11 on the floor 13 of a vehicle, the lower mat means 15 can be merely placed directly on top of the floor 13 of the vehicle in the desired location. The upper mat means 45 can be placed over and attached to the upper surface 19 of the lower mat means 15 either before or after the lower mat means 15 is placed on the floor 13 of the vehicle. In either case, the first member 79 of the first attachment means 73 will mate and coact with the first member 91 of the second attachment means 77, the second member 81 of the first attachment means 73 will mate and coact with the second member 93 of the second attachment means 77, the third member 83 of the first attachment means 73 will mate and coact with the third member 95 of the second attachment means 77, the fourth member 85 of the first attachment means 73 will mate and coact with the fourth member 97 of the second attachment means 77, the fifth member 87 of the first attachment means 73 will mate and coact with the fifth member 99 of the second attachment means 77, and the sixth member 89 of the first attachment means 73 will mate and coact with the sixth member 101 of the second attachment means 77 to removably attach the upper mat means 45 to the upper surface 19 of the body 17 of the lower mat means 15. The upper mat means can subsequently be removed from the lower mat means 15 by merely pulling the upper mat means 45 away from the lower mat means 15, thereby leaving the lower mat means 15 on the floor 13 of the vehicle and allowing the upper mat means 45 to be washed or otherwise cleaned, etc. The lower mat means 15 can be used without the upper mat means 45 during wet, snowy, muddy or otherwise dirty conditions and can be easily removed from the vehicle for cleaning or discarding any water or other liquid that may be held in the cavities 39.

Although the present invention has been described and illustrated with respect to a preferred embodiment and a preferred use therefor, it is not to be so limited since modifications and changes can be made therein which are within the full intended scope of the invention.

I claim:

1. In combination, a vehicle having a floor covered by carpet, and a removable mat for placement on top of the carpet that covers the floor of the vehicle, said mat comprising:
   (a) a lower mat means for removable placement on top of the carpet that covers the floor of the vehicle; said lower mat means including a body having an upper surface, a lower surface, a first side edge, a second side edge, a third side edge, and a fourth side edge, in which said upper surf of said lower mat means has a plurality of cavities thereof for holding liquid;
   (b) an upper mat means for placement over said upper surface of said lower mat means; said upper mat means including a body having an upper surface, a lower surface, a first side edge, a second side edge, a third side edge, and a fourth side edge; and
   (c) attachment means for removably attaching said upper mat means to said lower mat means; said attachment means including first attachment means secured to said upper surface of said lower mat means and including second attachment means secured to said lower surface of said upper mat means for coacting with said first attachment means to removably attach said first side edge, said second side edge, said third said edge and said fourth side edge of said body of said upper mat means to the respective said first side edge, said second edge, said third said edge and said fourth said edge of said lower mat means.

2. The mat of claim 1 in which said upper mat means has an upper surface composed of carpet.

3. The mat of claim 1 in which said attachment means consist of hook and loop fastener material.

4. A removable mat for the floor of an automobile, said mat comprising:
   (a) a lower mat means for removable placement on the floor of the vehicle; said lower mat means including an upper surface and a lower surface; said upper surface of said lower mat means has a plurality of cavities thereof for holding liquid; said upper surface of said lower mat means having a first corner, a second corner, a third corner, a fourth corner, a first side extending between said first and third corners, and a second side extending between said second and fourth corners;
   (b) an upper mat means for placement over said upper surface of said lower mat means; said upper mat means having an upper surface composed of carpet and having a lower surface; said lower surface of said upper mat means having a first corner, a second corner, a third corner, a fourth corner, a first side extending between said first and third corners, and a second side extending between said second and fourth corners; and
   (c) attachment means for removably attaching said upper mat means to said lower mat means; said attachment means including first attachment means secured to said upper surface of said lower mat means and including second attachment means secured to said lower surface of said upper mat means for coacting with said first attachment means to removably attach said upper mat means to said lower mat means; said first attachment means including a first member positioned at said first corner of said upper surface of said lower mat means, a second member positioned at said second corner of said upper surface of said lower mat means, a third member positioned at said third corner of said upper surface of said lower mat means, a fourth member positioned at said fourth corner of said upper surface of said lower mat means, a fifth member positioned adjacent said first side of said upper surface of said lower mat means substantially midway between said first and third corners thereof, and a sixth member positioned adjacent said second side of said upper surface of said lower mat means substantially midway between said second and fourth corners thereof; said second attachment means including a first member positioned at said first corner of said lower surface of said upper mat means, a second member positioned at said second corner of said lower surface of said upper mat means, a third member positioned at said third corner of said lower surface of said upper mat means, a fourth member positioned at said fourth corner of said lower surface of said upper mat means, a fifth member positioned adjacent said first side of said lower surface of said upper mat means substantially midway between said first and third corners thereof, and a sixth member positioned adjacent said second side of said lower surface of said upper mat means substantially midway between said second and fourth corners thereof.

5. The mat of claim 4 in which said attachment means consist of hook and loop fastener material.

* * * * *